United States Patent [19]
Komoto

[11] Patent Number: 5,635,938
[45] Date of Patent: Jun. 3, 1997

[54] QUANTIZING AND DEQUANTIZING CIRCUIT WITH REDUCED SIZE

[75] Inventor: Eiji Komoto, Tokyo, Japan

[73] Assignee: Oki Electric Industry Co., Ltd., Tokyo, Japan

[21] Appl. No.: 365,467

[22] Filed: Dec. 28, 1994

[30] Foreign Application Priority Data

Dec. 28, 1993 [JP] Japan .................................. 5-338220

[51] Int. Cl.$^6$ ...................................................... H03M 7/00
[52] U.S. Cl. ........................................................ 341/200
[58] Field of Search ................................. 341/200, 65, 67, 341/90, 106, 107

[56] References Cited

U.S. PATENT DOCUMENTS

| | | |
|---|---|---|
| 4,658,239 | 4/1987 | Grallert . |
| 4,694,417 | 9/1987 | Cantwell . |
| 4,920,411 | 4/1990 | Miyakawa . |
| 5,136,290 | 8/1992 | Bond et al. . |
| 5,243,342 | 9/1993 | Kattemalaiavadi et al. . |
| 5,430,556 | 7/1995 | Ito ............................................. 358/427 |

FOREIGN PATENT DOCUMENTS 5-110863A  4/1993  Japan .

OTHER PUBLICATIONS

International Standard DIS 10918-1, CCITT Recommendation T.81, Digital Compression and Coding of Continuous--Tone Still Images, Part I: Requirements and Guidelines, pp. A-6, A-7. (no date available).

*Primary Examiner*—Brian K. Young
*Attorney, Agent, or Firm*—Spencer & Frank

[57] ABSTRACT

A quantizing and dequantizing circuit has a first memory circuit with integer addresses, in which reciprocal data are stored, and a second memory circuit, in which a quantization table of integers is stored. The Integers stored in the second memory circuit are provided to the first memory circuit as address signals, causing output of the corresponding reciprocal data. Data to be quantized are multiplied by the reciprocal data output by the first memory circuit. Data to be dequantized are multiplied by the integers output from the second memory circuit.

27 Claims, 6 Drawing Sheets

FIG.3

| ADDRESS | OUTPUT |
|---|---|
| 1 | 1 0 0 0 0 0 0 0 0 0 \| 0 0 0 0 0 0 0 |
| 2 | 0 \| 1 0 0 0 0 0 0 0 0 \| 0 0 0 0 0 0 |
| 3 | 0 0 \| 1 0 1 0 1 0 1 0 1 0 1 \| 0 0 0 0 0 0 |
| 4 | 0 0 \| 1 0 0 0 0 0 0 0 0 0 \| 0 0 0 0 0 0 |
| 5 | 0 0 \| 0 1 0 0 0 0 0 0 0 0 0 \| 0 0 0 0 0 0 |

43 ........ 43

8

| 9 | 0 0 0 0 \| 1 1 1 0 0 0 1 1 1 0 1 \| 0 0 0 0 |

16

| 17 | 0 0 0 0 0 \| 1 1 1 1 0 0 0 1 0 0 0 \| 0 0 0 |

32

| 33 | 0 0 0 0 0 0 \| 1 1 1 1 0 0 0 0 1 0 \| 0 0 |

64

| 65 | 0 0 0 0 0 0 0 \| 1 1 1 1 1 1 0 0 0 0 0 \| 0 |

128

| 129 | 0 0 0 0 0 0 0 0 \| 1 1 1 1 1 1 1 0 0 0 0 |

255

QUANTIZING AND DEQUANTIZING CIRCUIT WITH REDUCED SIZE

BACKGROUND OF THE INVENTION

This invention relates to a quantizing and dequantizing circuit for use in, for example, a device that compresses and decompresses digitized image data.

Efficient recording and transmission of digitized image data demands that the data be compressed. In one standard compression method, an image is divided into, for example, eight-by-eight pixel blocks. First, each block of pixel values is converted by a discrete cosine transformation (DCT) to spatial frequency values (DCT coefficients). The transformed data are next quantized by dividing the data by a set of values representing quantization step sizes, using different step sizes for different frequencies. The quantized data are then encoded by Huffman-type variable-length encoding, in which shorter codewords are assigned to frequently-occurring data and longer codewords to infrequently-occurring data.

In decompression, this procedure is followed in reverse. Huffman decoding is used to recover the quantized data, which are next dequantized by multiplication by the same step-size values as were used in quantization. Then an inverse discrete cosine transformation (IDCT) is applied to reconstruct the pixel values.

Devices that perform image compression and decompression accordingly have a circuit that performs quantization during compression and dequantization during decompression. A conventional quantizing and dequantizing circuit comprises a memory that stores a set of step-size values, a hardware divider for dividing data by these values to quantize the data, and a hardware multiplier for multiplying data by the same values to dequantize the data.

A problem with this conventional circuit is that hardware multipliers and dividers are complex circuits that take up considerable space. To reduce the size and cost of the compression and decompression device, a smaller quantizing and dequantizing circuit design is desirable.

A constraining factor Is that while the compression procedure described above is embodied in several standards, there is no single agreed-on set of step-size values; that is, there is no single standard quantization table. To accommodate a variety of image data, the compression and decompression device needs to be able to operate with various quantization tables.

SUMMARY OF THE INVENTION

It is accordingly an object of the present invention to reduce the size of a quantizing and dequantizing circuit.

The invented quantizing and dequantizing circuit has a first memory circuit with integer addresses, at which are stored reciprocal data used for quantization, such as the reciprocals of the integer addresses, a second memory circuit, in which is stored a quantization table of integers, and a multiplier.

When data to be quantized or dequantized are input, the integers stored in the second memory circuit are output to the first memory circuit as address signals, causing output of the corresponding reciprocal data.

The multiplier multiplies data to be dequantized by the integers output from the second memory circuit. Data to be quantized are multiplied by the reciprocal data output by the first memory circuit, or by data obtained from these reciprocal data.

BRIEF DESCRIPTION OF THE DRAWINGS

FIG. 3 illustrates the adding of leading and trailing zero-valued bits in the second embodiment.

DETAILED DESCRIPTION OF THE INVENTION

Embodiments of the invention will be described with reference to the attached illustrative drawings.

Figure 1:
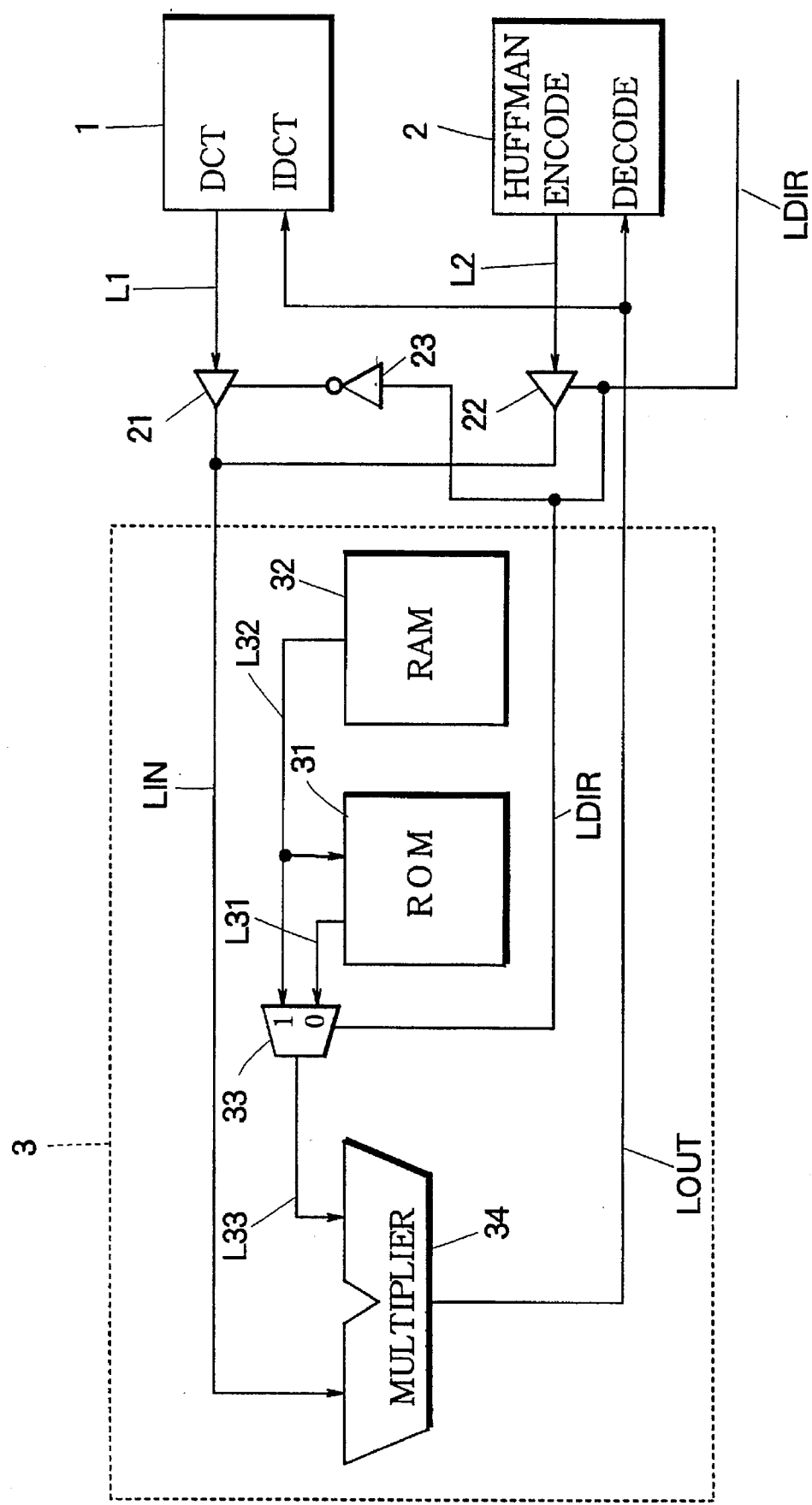
FIG. 1 is a block diagram illustrating a first embodiment of the invention.

FIG. 1 is a block diagram of an image compression and decompression device employing a first embodiment of the invention. The device comprises a DCT/IDCT processor 1 for performing the discrete cosine transformation and inverse discrete cosine transformation, a Huffman processor 2 for performing variable-length encoding and decoding, and a quantizing and dequantizing circuit 3.

These elements are interconnected via a pair of tri-state buffers 21 and 22. Tri-state buffer 21 is coupled to the DCT/IDCT processor 1 by a signal line L1, and feeds data from the DCT/IDCT processor 1 to a signal line LIN in the quantizing and dequantizing circuit 3. Tri-state buffer 22 is coupled to the Huffman processor 2 by a signal line L2, and feeds data from the Huffman processor 2 to the same signal line LIN.

Tri-state buffer 22 is controlled by an LDIR control signal having two states. The first state (low, or "0") designates quantization; the second state (high, or "1") designates dequantization. Tri-state buffer 22 is switched off when LDIR is in the first ("0") state, and on when LDIR is in the second ("1") state.

Control signal LDIR is also coupled through an inverter 23 to tri-state buffer 21. Tri-state buffer 21 is switched on when LDIR is in the "0" state, and off when LDIR is in the "1" state.

The quantizing and dequantizing circuit 3 comprises a read-only memory (ROM) 31, a read-write memory such as a random-access memory (RAM) 32, a selector 33, and a multiplier 34.

The ROM 31 has integer addresses from one to N, where N is a suitable integer greater than one. The invention is not restricted to any particular value of N, but in the present embodiment N will be two hundred fifty-five. At each address n from one to N, the ROM 31 stores data representing the reciprocal $1/n$ of n.

In this first embodiment the reciprocal data are stored in nineteen-bit fixed-point form. Table 1 shows some of the data values, giving the integer address in decimal notation, the stored reciprocal data in binary notation, and the same reciprocal data expressed in hexadecimal notation. The fixed radix point occurs after the first binary digit.

TABLE 1

| | 19-Bit Fixed-Point Reciprocal Data | |
|---|---|---|
| Address | Binary | Hexadecimal |
| 1 | 1000000000000000000 | 40000 |
| 2 | 0100000000000000000 | 20000 |
| 3 | 0010101010101010101 | 15555 |
| 4 | 0010000000000000000 | 10000 |
| 5 | 0001100110011001101 | 0CCCD |
| 6 | 0001010101010101011 | 0AAAB |
| . | . | . |
| 8 | 0001000000000000000 | 08000 |
| 9 | 0000111000111000111 | 071C7 |
| . | . | . |
| 15 | 0000100010001000100 | 04444 |
| 16 | 0000100000000000000 | 04000 |
| 17 | 0000011110000111100 | 03C3C |
| . | . | . |
| 31 | 0000010000100001000 | 02108 |
| 32 | 0000010000000000000 | 02000 |
| 33 | 0000001111100001000 | 01F08 |
| . | . | . |
| 63 | 0000001000001000001 | 01041 |
| 64 | 0000001000000000000 | 01000 |
| 65 | 0000000111111000001 | 00FC1 |
| . | . | . |
| 127 | 0000000100000010000 | 00810 |
| 128 | 0000000100000000000 | 00800 |
| 129 | 0000000011111110000 | 007F0 |
| . | . | . |
| 255 | 0000000010000000100 | 00404 |

The RAM 32 stores a quantization table comprising, for example, sixty-four integer values between one and two hundred fifty-five. The stored integer values need not all be different. Integer data are output from the RAM 32 on a signal line L32, and become the address input of the ROM 31.

Incidentally, although quantization step sizes need not in general be integers, they can be treated as integers by using fixed-point expressions and ignoring the radix point. This technique is well known in the computing art.

The output data line L31 of the ROM 31 and the output data line L32 of the RAM 32 are both coupled to the selector 33, which is controlled by the LDIR control signal. When LDIR is in the first ("0") state, the selector 33 selects reciprocal data from the ROM 31 received on signal line L31. When LDIR is in the second ("1") state, the selector 33 selects integer data from the RAM 32 received on signal line L32. The selector 33 outputs the selected data to the multiplier 34 on signal line L33.

The multiplier 34 multiplies the data received on signal line L33 by the data received on signal line LIN, and outputs the resulting product to both the DCT/IDCT processor 1 and Huffman processor 2 on signal line LOUT.

Signal lines L1, L2, LIN, LOUT, L31, L32, and L33 are multiple-bit signal lines, each comprising a plurality of parallel one-bit signal lines.

Next the operations of quantization and dequantization will be described.

Prior to either of these operations, a quantization table of integers is loaded into the RAM 32 from an external source, via signal lines not visible in the drawing. The reason for employing a read-write memory such as the RAM 32 is so that different quantization tables can be loaded as required by different image-compression standards and algorithms.

For quantization, the LDIR control signal is in its first ("0") state, tri-state buffer 21 is switched on, and tri-state buffer 22 is switched off. The DCT/IDCT processor 1 receives an eight-by-eight block of pixel data to be compressed, carries out a discrete cosine transformation, and outputs the resulting sixty-four transformed data values in sequence via signal lines L1 and LIN to the quantizing and dequantizing circuit 3.

In synchronization with the arrival of data on line LIN, the RAM 32 is driven by an address counter not (shown in the drawing) so as to output, in a fixed sequence, the integers in the stored quantization table. Each integer output by the RAM 32 is carried by signal line L32 to the ROM 31, causing the ROM 31 to output the corresponding reciprocal data on signal line L31. Since LDIR is in the first ("0") state, the selector 33 selects the reciprocal data on signal line L31 for output to the multiplier 34.

The multiplier 34 multiplies the incoming data on signal line LIN by the reciprocal data on signal line L33. Since multiplication by reciprocal data 1/n is equivalent to division by the integer n, the data on signal line LIN are in effect divided by the values in the quantization table in the RAM 32, and are thereby quantized. The multiplier 34 outputs the data thus quantized on signal line LOUT to the Huffman processor 2, which compresses the quantized data by variable-length encoding.

The multiplier 34 also outputs the quantized data to the DCT/IDCT processor 1, but when LDIR is In the "0" state, this input to the DCT/IDCT processor 1 is ignored.

For dequantization, the LDIR control signal is in its second ("1") state, tri-state buffer 21 is switched off, and tri-state buffer 22 is switched on. The Huffman processor 2 receives compressed image data from an external source, carries out variable-length decoding, and outputs the decoded data in sequence via signal lines L2 and LIN to the quantizing and dequantizing circuit 3.

In synchronization with the arriving data on signal line LIN, as before, the RAM 32 outputs integers n from its quantization table on signal line L32, and the ROM 31 outputs their reciprocals 1/n on signal line L31. This time, since LDIR is in the "1" state, the selector 33 selects the integers n on signal line L32, and the multiplier 34 multiplies the data on signal line LIN by these integers, thereby dequantizing the data.

The dequantized data are output on signal line LOUT to the DCT/IDCT processor 1, which carries out an inverse discrete cosine transformation to generate decompressed pixel data. The dequantized data are also output to the Huffman processor 2, but this input to the Huffman processor 2 is ignored when LDIR is in the "1" state.

In this way, the invented circuit can both quantize and dequantize data using only a multiplier 34, without requiring a divider. The divider of the prior art is replaced by the smaller and less complex ROM 31, thereby reducing the overall size of the quantizing and dequantizing circuit.

Figure 2:
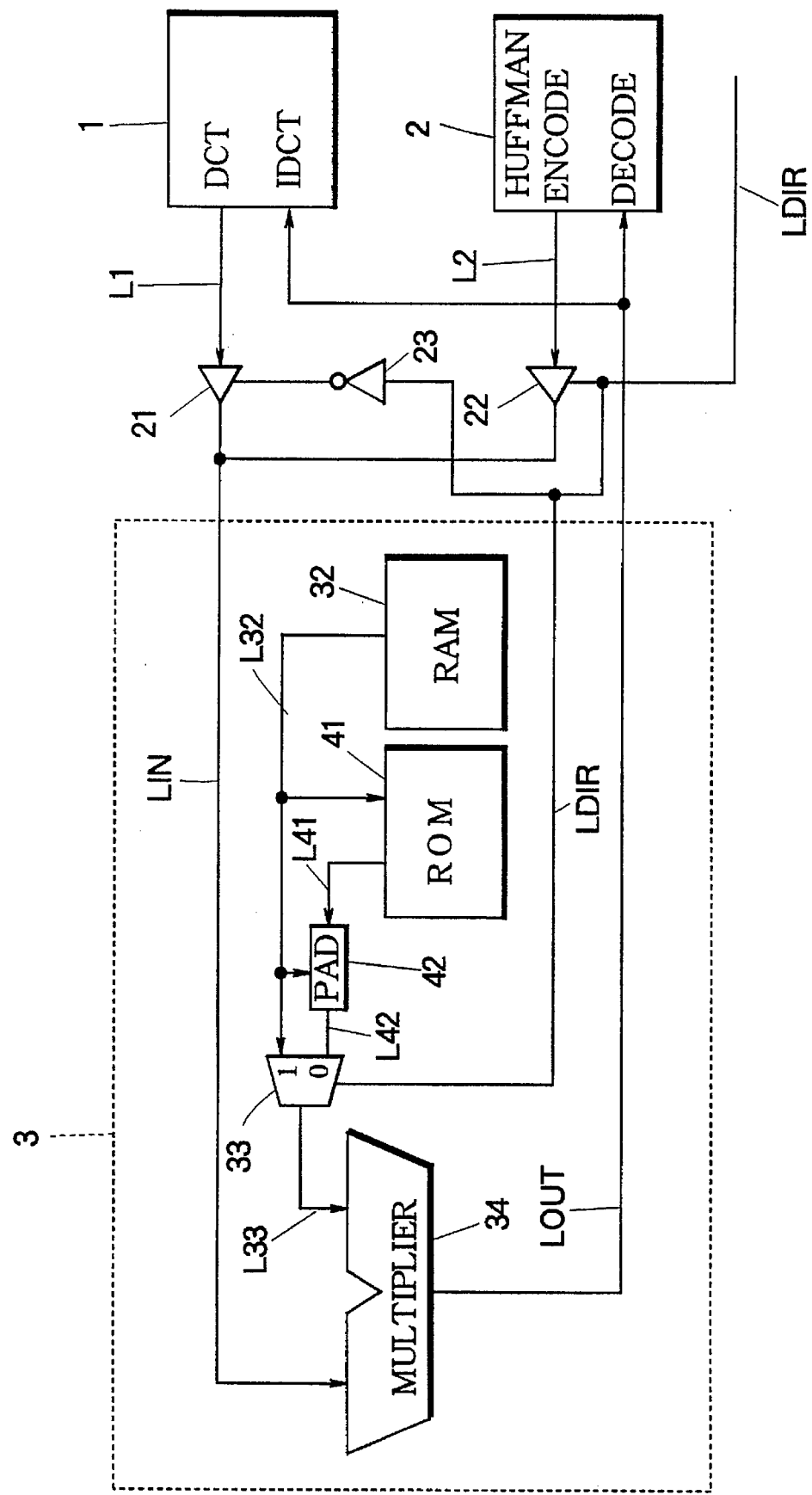
FIG. 2 is a block diagram illustrating a second embodiment of the invention.

Next a second embodiment will be described, in which the circuit size Is further reduced by storing the reciprocal data In compressed form. This second embodiment is shown in FIG. 2, using the same reference numerals as in FIG. 1 for identical constituent elements, descriptions of which will be omitted. The differing elements are the ROM 41, which replaces the ROM 31 of FIG. 1, a new zero padder 42, and their interconnecting signal lines L41 and L42.

The reciprocal data, which were stored in nineteen-bit fixed-point form in the ROM 31 in FIG. 1, are compressed to eleven bits in the ROM 41 in FIG. 2. The compression is effected by removing all leading zero-valued bits, and as many trailing bits as necessary to remove eight bits in all. Table 2 shows some of the compressed data in binary and hexadecimal form, and indicates the number of leading zero-valued bits removed. When trailing bits are removed, in some cases the resulting value is rounded up.

TABLE 2

Eleven-Bit Compressed Reciprocal Data

| Address | Binary | Hex. | Leading Zeros Removed |
|---|---|---|---|
| 1 | 10000000000 | 400 | 0 |
| 2 | 10000000000 | 400 | 1 |
| 3 | 10101010101 | 555 | 2 |
| 4 | 10000000000 | 400 | 2 |
| 5 | 11001100110 | 666 | 3 |
| 6 | 10101010110 | 556 | 3 |
| . | . | . | . |
| . | . | . | . |
| . | . | . | . |
| 8 | 10000000000 | 400 | 3 |
| 9 | 11100011100 | 71C | 4 |
| . | . | . | . |
| . | . | . | . |
| . | . | . | . |
| 15 | 10001000100 | 444 | 4 |
| 16 | 10000000000 | 400 | 4 |
| 17 | 11110001000 | 788 | 5 |
| . | . | . | . |
| . | . | . | . |
| . | . | . | . |
| 31 | 10000100001 | 421 | 5 |
| 32 | 10000000000 | 400 | 5 |
| 33 | 11111000010 | 7C2 | 6 |
| . | . | . | . |
| . | . | . | . |
| . | . | . | . |
| 63 | 10000010000 | 410 | 6 |
| 64 | 10000000000 | 400 | 6 |
| 65 | 11111100000 | 7E0 | 7 |
| . | . | . | . |
| . | . | . | . |
| . | . | . | . |
| 127 | 10000001000 | 408 | 7 |
| 128 | 10000000000 | 400 | 7 |
| 129 | 11111110000 | 7F0 | 8 |
| . | . | . | . |
| . | . | . | . |
| . | . | . | . |
| 255 | 10000000100 | 404 | 8 |

In Table 1 there were m leading zero-valued bits in the reciprocal data at addresses from $2^{m-1}+1$ to $2^m$, and this is the number of leading zero-valued bits removed in Table 2. No leading zero-valued bits are removed at address one, one leading zero-valued bit is removed at address two, two leading zero-valued bits are removed at addresses three and four, three leading zero-valued bits are removed at addresses five through eight, and so on.

The zero padder 42 has the function of restoring these leading zero-valued bits. Details will be given below.

Next the quantizing operation of this second embodiment will be described.

As in the first embodiment, the control signal LDIR is in the "0" state. The quantizlng and dequantizing circuit 3 receives transformed data on signal line LIN, and the RAM 32 outputs corresponding integer data from its quantization table on signal line L32. The ROM 41 outputs the corresponding compressed reciprocal data on signal line L41.

The zero padder 42 receives both the compressed reciprocal data on signal line L41 and the integer data on signal line L32. By decoding the integer data on signal line L32, the zero padder 42 can determine how many leading zero-valued bits have been removed from the reciprocal data on signal line L41. The zero padder 42 adds this number of leading zero-valued bits on the left of the compressed reciprocal data, adds as many additional zero-valued bits on the right as necessary to bring the data length to nineteen bits, and outputs the resulting uncompressed reciprocal data on signal line L42.

Since LDIR is in the "0" state, the selector 33 selects the reciprocal data on signal line L42 for output on signal line L33. Subsequent operations are as in the first embodiment, the multiplier 34 multiplying the data on signal line LIN by the reciprocal data on signal line L33, and outputting quantized data for encoding by the Huffman processor 2.

Dequantization is the same as in the first embodiment, because the selector 33 selects signal line L32 and does not use the reciprocal data from the ROM 41.

A description of the decoding logic in the zero padder 42 will be omitted to avoid obscuring the invention with needless detail, but the operation performed by the zero padder 42 is illustrated in FIG. 3. Addresses in the ROM 41 are listed on the left in FIG. 3. To the right of each address is shown the corresponding nineteen-bit output of the zero padder 42. Within this nineteen-bit output, the eleven-bit output of the ROM 41 is shown delimited by vertical lines 43. Leading and trailing zero-valued bits added by the zero padder 42 can be seen to the left and right of these vertical lines 43. No leading zero-valued bits are added for address one, and no trailing zero-valued bits for addresses exceeding one hundred twenty-eight.

Compression of the reciprocal data entails some loss of accuracy in trailing bit positions, but saves approximately two kilobits of storage space. (More precisely, 255×8=2040 bits are saved.) The reduction in size of the ROM 41 exceeds the additional space occupied by the zero padder 42, so the overall size of the quantizlng and dequantizing circuit is reduced.

Figure 4:
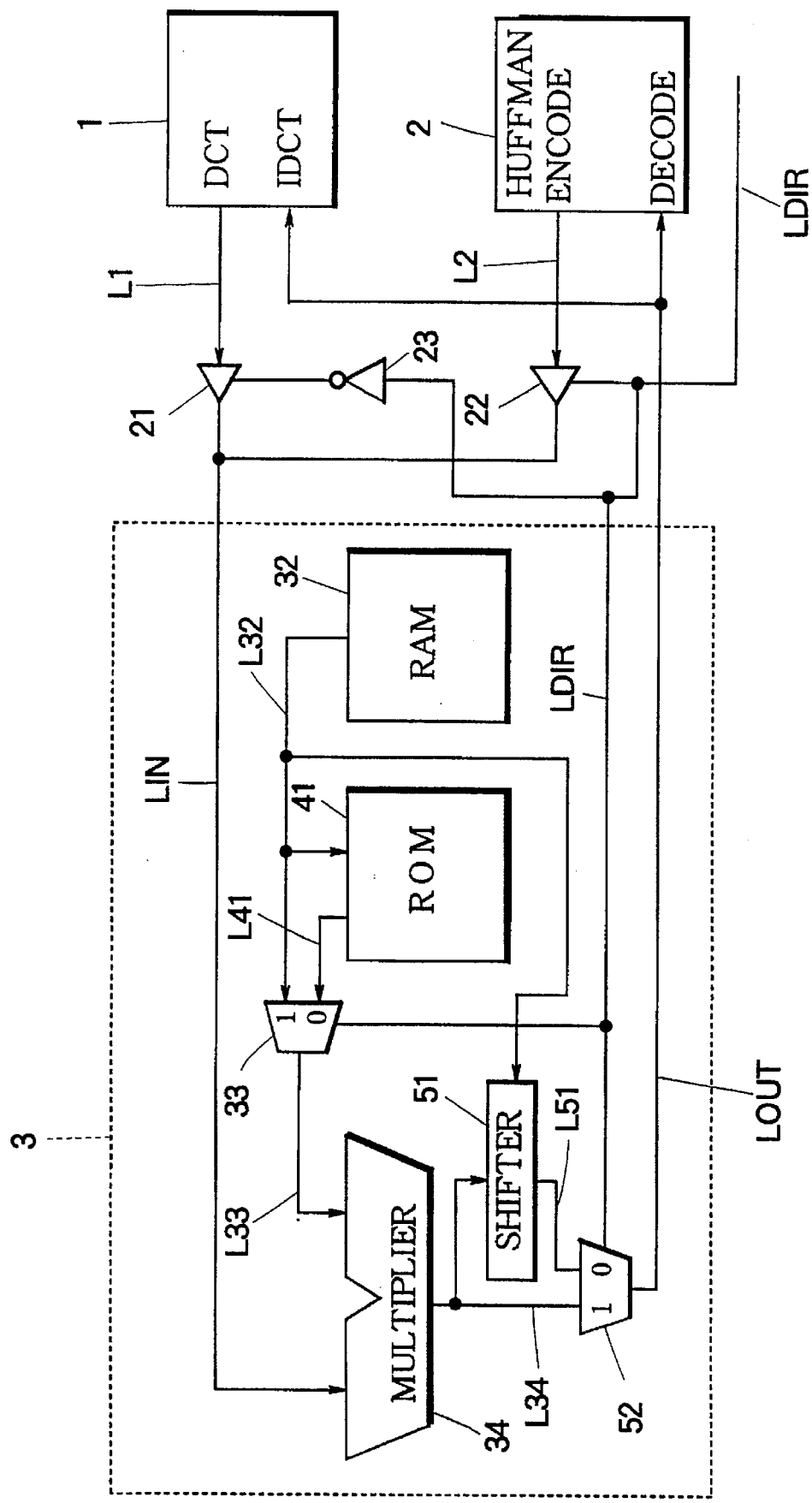
FIG. 4 is a block diagram illustrating a third embodiment of the invention.

FIG. 4 shows a third embodiment of the invention, using the same reference numerals as in FIG. 2 to denote identical constituent elements, descriptions of which will be omitted. The zero padder 42 of FIG. 2 is eliminated, the output of the ROM 41 being provided directly to the selector 33. The new elements are a shifter S1 and a second selector 52.

The shifter 51 receives the outputs of the RAM 32 and multiplier 34, and shifts the output of the multiplier 34 to the right by a number of bits determined from the output of the RAM 32. The selector 52 receives the outputs of the multiplier 34 and shifter 51 and the control signal LDIR, and operates analogously to the first selector 33. The reciprocal data in the ROM 41 are compressed to eleven bits as in Table 2.

The quantizing operation of this embodiment will be described next. Control signal LDIR is in the first ("0") state, so selector 33 selects the output of the ROM 41 on signal line L41, and selector 52 selects the output of the shifter 51 on signal line L51. The multiplier 34 multiplies the transformed data on signal line LIN by the compressed reciprocal data output from the ROM 41, which it receives on signal line L33 from the selector 33.

Figure 5:
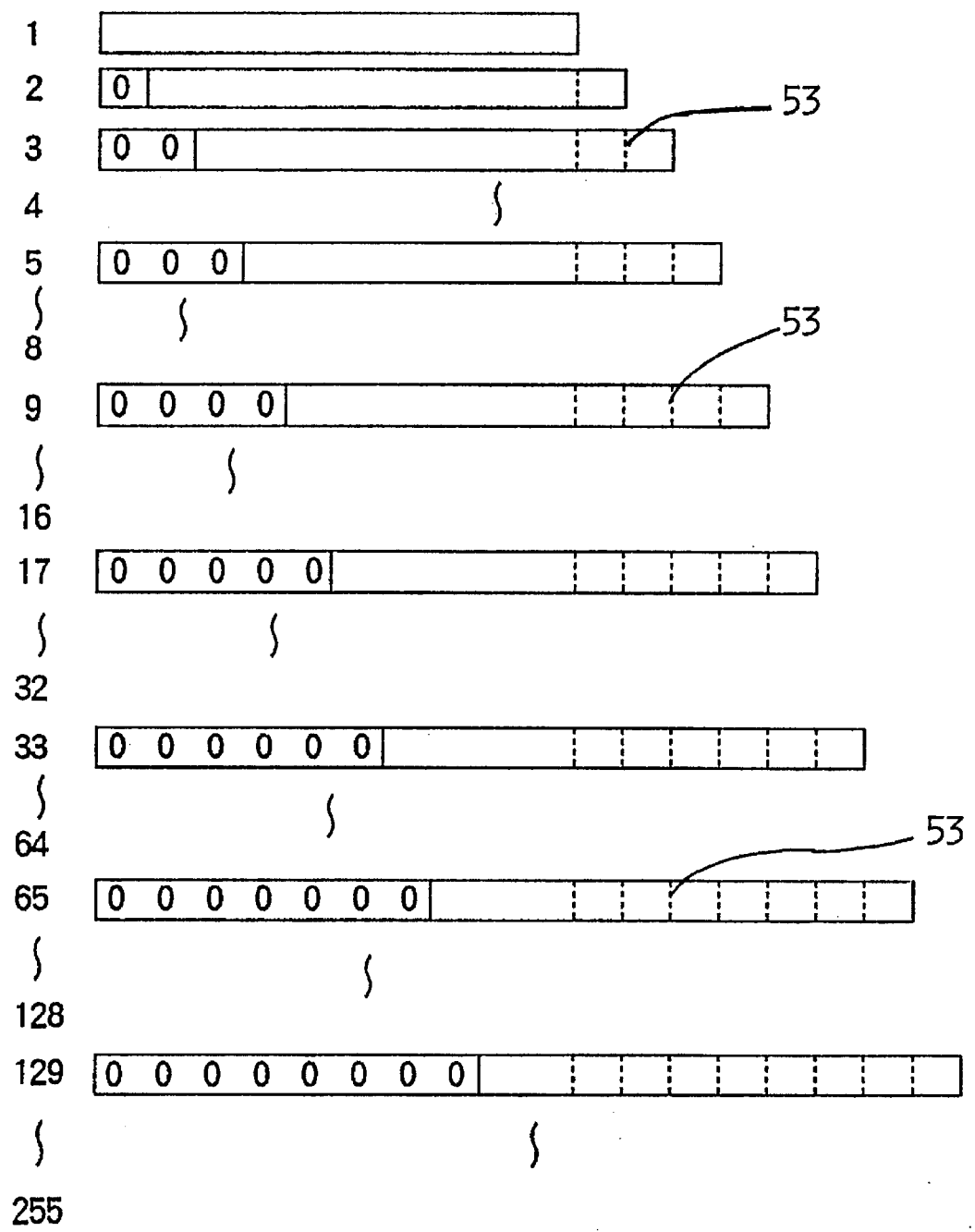
FIG. 5 illustrates the right shift carried out in the third embodiment.

FIG. 5 illustrates the right shift applied by the shifter 51 to the output of the multiplier 34, responsive to the integer output of the RAM 32. This integer output is labeled "address" in FIG. 5, since it is also the address input to the ROM 41. The right shift is by zero bits (no shift) when the address is one, by one bit when the address is two, by two bits when the address is three or four, by three bits when the address is five to eight, and so on. The shifted output of the shifter 51 is supplied through selector 52 to signal line LOUT, thence to the Huffman processor 2 for encoding.

The dotted lines labeled 53 in FIG. 5 exemplify bits that are shifted out and lost. The input and output data length of the shifter 51 is the same as the output data length of the multiplier 34. (FIG. 5 is not necessarily drawn to scale.)

The number of leading zero-valued bits added by the shifter 51 In FIG. 5 is the same as the number of leading zero-valued bits added by the zero padder 42 in FIG. 3. It makes no difference whether these leading zero-valued bits are added before or after multiplication. The output on signal line LOUT is the same in both cases, so the second and third embodiments produce identically quantized data.

Dequantization operations in the third embodiment are the same as in the first and second embodiments, selector 33 selecting the integer data on signal line L32 and selector 52 selecting the output of the multiplier 34.

Figure 6:
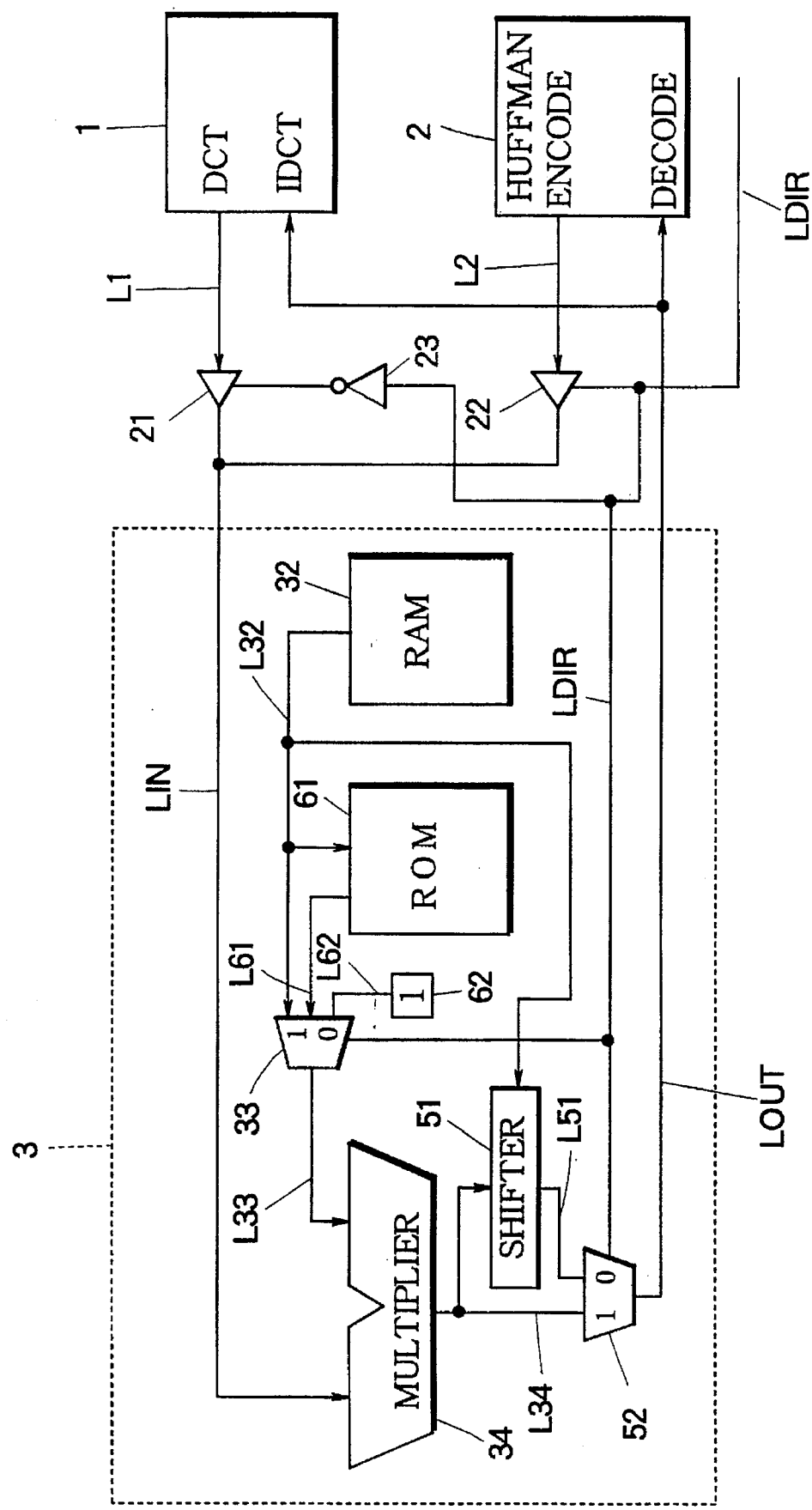
FIG. 6 is a block diagram illustrating a fourth embodiment of the invention.

FIG. 6 shows a fourth embodiment of the invention, using the same reference numerals as In FIG. 4 to denote identical constituent elements, descriptions of which will be omitted. The ROM 61, which replaces the ROM 41 of FIG. 4, stores the reciprocal data in ten-bit compressed form, omitting a single leading one-valued bit from each of the data values in Table 2. Table 3 indicates the data stored in the ROM 61 in binary and hexadecimal form, and shows the removed leading bits in binary form. A logic-one node 62 provides a constant "one" (high) logic-level potential, to take the place of these leading one-valued bits.

TABLE 3

Ten-Bit Compressed Reciprocal Data

| Address | Binary | Hex. | Leading Bits Removed |
|---------|--------|------|----------------------|
| 1 | 0000000000 | 000 | 1 |
| 2 | 0000000000 | 000 | 01 |
| 3 | 0101010101 | 155 | 001 |
| 4 | 0000000000 | 000 | 001 |
| 5 | 1001100110 | 266 | 0001 |
| 6 | 0101010110 | 156 | 0001 |
| . | . | . | . |
| 8 | 0000000000 | 000 | 0001 |
| 9 | 1100011100 | 31C | 00001 |
| . | . | . | . |
| 15 | 0001000100 | 044 | 00001 |
| 16 | 0000000000 | 000 | 00001 |
| 17 | 1110001000 | 388 | 000001 |
| . | . | . | . |
| 31 | 0000100001 | 021 | 000001 |
| 32 | 0000000000 | 000 | 000001 |
| 33 | 1111000010 | 3C2 | 0000001 |
| . | . | . | . |
| 63 | 0000010000 | 010 | 0000001 |
| 64 | 0000000000 | 000 | 0000001 |
| 65 | 1111100000 | 3E0 | 00000001 |

TABLE 3-continued

Ten-Bit Compressed Reciprocal Data

| Address | Binary | Hex. | Leading Bits Removed |
|---------|--------|------|----------------------|
| . | . | . | . |
| 127 | 0000001000 | 008 | 00000001 |
| 128 | 0000000000 | 000 | 00000001 |
| 129 | 1111110000 | 3F0 | 000000001 |
| . | . | . | . |
| 255 | 0000000100 | 004 | 000000001 |

The ROM 61 outputs ten bits of compressed reciprocal data as shown in Table 3 on signal line L61. The logic-one node 62 adds a leading one-valued bit on signal line L62. In quantization (when LDIR="0"), the selector 33 selects these eleven bits on signal lines L61 and L62 and provides them on signal line L33 to the multiplier 34.

Further quantization operations are as in the third embodiment. Dequantization operations are as in the first, second, and third embodiments, selectors 33 and 52 selecting the integer data on signal line L32 and the multiplier output on signal line L34, respectively.

By eliminating two hundred fifty-five bits from the ROM 61, the fourth embodiment further reduces the size of the quantizing and dequantizing circuit.

The invention is not restricted to the preceding embodiments, but permits numerous modifications. For example, the ROM 41 in the second embodiment can be modified to store data in the same ten-bit compressed form as the ROM 61 in the fourth embodiment. The zero padder 42 must then be provided with a logic-one node to add a leading one-valued bit, as in the fourth embodiment, before the leading zero-valued bits are added.

The read/write memory that stores the quantization table need not be a random-access memory. A sequential-access memory can be employed. So-called flash memory can be employed.

Those skilled in the art will recognize that various other modifications can be made without departing from the scope claimed below.

What is claimed is:

1. A quantizing and dequantizing circuit for quantizing first data and dequantizing second data, comprising: a first memory circuit with integer addresses, for storing, at each address, reciprocal data for quantizing said first data, and providing an output of said reciprocal data responsive to the address input, said first memory circuit storing said reciprocal data in a compressed form with leading zero-valued bits removed;

a second memory circuit for storing a quantization table of integers, and providing output of said integers as said address input to said first memory circuit;

a multiplier coupled to multiply said second data by the integers output from said second memory circuit, multiply said first data by reciprocals of said integers obtained from the reciprocal data output by said first memory circuit, and provide output of resulting products; and a zero padder, coupled to add leading zero-valued bits to the output of said first memory circuit in a quantity responsive to the output of said second memory circuit, before said output of said first memory circuit is furnished to said multiplier.

2. The circuit of claim 1, wherein said reciprocal data is represented by a reciprocal of said integer address.

3. The circuit of claim 1, wherein said first memory circuit is a read-only memory circuit and said second memory circuit is a read-write memory circuit.

4. A quantizing and dequantizing circuit for quantizing first data and dequantizing second data, comprising:

a first memory circuit with integer addresses, for storing, at each address, reciprocal data for quantizing said first data, and providing an output of said reciprocal data responsive to the address input, said first memory circuit storing said reciprocal data in a compressed form with leading zero-valued bits removed and with a single leading one-valued bit removed;

a second memory circuit for storing a quantization table of integers, and providing an output of said integers as said address input to said first memory circuit;

a multiplier coupled to multiply said second data by the integers output from said second memory circuit, multiply said first data by reciprocals of said integers obtained from the reciprocal data output by said first memory circuit, and provide output of resulting products; and a zero padder, coupled to add a single leading one-valued bit to the output of said first memory circuit, then also add leading zero-valued bits in a quantity responsive to the output of said second memory circuit, before said output of said first memory circuit is furnished to said multiplier.

5. The circuit of claim 4, wherein said reciprocal data is represented by a reciprocal of said integer address.

6. The circuit of claim 4, wherein said first memory circuit is a read-only memory circuit and said second memory circuit is a read-write memory circuit.

7. A quantizing and dequantizing circuit for quantizing first data and dequantizing second data, comprising:

a first memory circuit with integer addresses, for storing, at each address, reciprocal data for quantizing said first data, and providing an output of said reciprocal data responsive to the address input, said first memory circuit storing reciprocal data in a compressed form with leading zeros removed;

a second memory circuit for storing a quantization table of integers, and providing an output of said integers as said address input to said first memory circuit;

a multiplier coupled to multiply said second data by the integers output from said second memory circuit, multiply said first data by reciprocals of said integers obtained from the reciprocal data output by said first memory circuit, and provide output of resulting products;

a first selector controlled by a control signal having a first state indicating quantization and a second state indicating dequantization, coupled to furnish the output of said first memory circuit to said multiplier when said control signal is in said first state, and furnish the output of said second memory circuit to said multiplier when said control signal is in said second state;

a shifter, coupled to right-shift the output of said multiplier by a number of bits responsive to the output of said second memory circuit, and to output the shifted data; and a second selector, controlled by said control signal, coupled to select the shifted data output by said shifter when said control signal is in said first state, and to shift the output of said multiplier when said control signal is in said second state.

8. The circuit of claim 7, wherein said first memory circuit stores reciprocal data in a compressed form with leading zero-valued bits removed and with one leading one-valued bit removed, further comprising:

a logic-one node, coupled to add one leading one-valued bit to the output of said first memory circuit, before said output of said first memory circuit is furnished to said multiplier.

9. The circuit of claim 7, wherein said reciprocal data is represented by a reciprocal of said integer address.

10. The circuit of claim 7, wherein said first memory circuit is a read-only memory circuit and said second memory circuit is a read-write memory circuit.

11. A method of quantizing first data and dequantizing second data, comprising the steps of:

storing, in a first memory circuit having integer addresses, reciprocal data for quantizing said first data;

storing, in a second memory circuit, a quantization table of integers;

providing the integers stored in said second memory circuit to said first memory circuit as address signals, thereby causing an output of corresponding reciprocal data;

multiplying said first data by reciprocals of said integers obtained from said reciprocal data, thereby generating quantized data;

multiplying said second data by the integers output by said second memory circuit, thereby generating dequantized data;

generating a control signal having a first state indicating quantization and a second state indicating dequantization; and selecting the output of said first memory circuit or the output of said second memory circuit responsive to said control signal.

12. The method of claim 11, wherein said reciprocal data is represented by a reciprocal of said integer address.

13. The method of claim 11, wherein said first memory circuit is a read-only memory circuit and said second memory circuit is a read-write memory circuit.

14. A method of quantizing first data and dequantizing second data, comprising the steps of:

storing, in a first memory circuit having integer addresses, reciprocal data for quantizing said first data, said first memory circuit storing reciprocal data in a compressed form with leading zero-valued bits removed;

storing, in a second memory circuit, a quantization table of integers;

providing the integers stored in said second memory circuit to said first memory circuit as address signals, thereby causing an output of corresponding reciprocal data;

multiplying said first data by reciprocals of said integers obtained from said reciprocal data, thereby generating quantized data;

multiplying said second data by the integers output by said second memory circuit, thereby generating dequantized data; and adding leading zero-valued bits to the output of said first memory circuit in quantities responsive to the integers output by said second memory circuit.

15. The method of claim 11, wherein said first memory circuit stores reciprocal data in a compressed form with leading zero-valued bits removed.

16. A method of quantizing first data and dequantizing second data, comprising the steps of:

storing, in a first memory circuit having integer addresses, reciprocal data for quantizing said first data, said first memory circuit storing reciprocal data in a compressed form with leading zero-valued bits removed;

storing, in a second memory circuit, a quantization table of integers;

providing the integers stored in said second memory circuit to said first memory circuit as address signals, thereby causing an output of corresponding reciprocal data;

multiplying said first data by reciprocals of said integers obtained from said reciprocal data, thereby generating quantized data; and multiplying said second data by the integers output by said second memory circuit, thereby generating dequantized data;

right-shifting said quantized data by amounts responsive to the integers output by said second memory circuit.

17. A method of quantizing first data and dequantizing second data, comprising the steps of:

storing, in a first memory circuit having integer addresses, reciprocal data for quantizing said first data, said first memory circuit storing reciprocal data in a compressed form with leading zero-valued bits removed and with a single leading one-valued bit removed;

storing, in a second memory circuit, a quantization table of integers;

providing the integers stored in said second memory circuit to said first memory circuit as address signals, thereby causing an output of corresponding reciprocal data;

multiplying said first data by reciprocals of said integers obtained from said reciprocal data, thereby generating quantized data;

multiplying said second data by the integers output by said second memory circuit, thereby generating dequantized data; and adding a single leading one-valued bit to the output of said first memory circuit.

18. The method of claim 17, comprising the further step of adding leading zero-valued bits to the output of said first memory circuit in a quantity responsive to the integers output by said second memory circuit.

19. The method of claim 17, comprising the further step of right-shifting said quantized data by a number of bits responsive to the integers output by said second memory circuit.

20. A quantizing and dequantizing circuit for quantizing first data and dequantizing second data, comprising:

a first memory circuit storing reciprocal data for quantizing said first data:

a second memory circuit storing a quantization table of integers for dequantizing said second data;

a multiplier for multiplying said first data by said reciprocal data and for multiplying said second data by said integers; and a shifter for shifting an output of said multiplier according to the quantization table of integers.

21. The circuit of claim 20, wherein the reciprocal data in said first memory circuit are selected by an address corresponding to an integer in the quantization table of integers.

22. The circuit of claim 20, wherein the reciprocal data are stored in said first memory circuit in a compressed form with leading zero-valued bits removed.

23. The circuit of claim 20, wherein the reciprocal data are stored in said first memory circuit in a compressed form with leading zero-valued bits removed and with one leading one-valued bit removed, further comprising:

a logic-one node for adding a leading one-valued bit to the reciprocal data.

24. A quantizing and dequantizing circuit for quantizing first data and dequantizing second data, comprising:

a first memory circuit storing reciprocal data for quantizing said first data:

a second memory circuit storing a quantization table of integers for dequantizing said second data;

a padder for padding the reciprocal data and outputting padded reciprocal data; and a multiplier for multiplying said first data by said padded reciprocal data and for multiplying said second data by said integers.

25. The circuit of claim 24, wherein the reciprocal data in said first memory circuit are selected by an address corresponding to an integer in the quantization table of integers.

26. The circuit of claim 24, wherein the reciprocal data are stored in said first memory circuit in a compressed form with leading zero-valued bits removed.

27. The circuit of claim 24, wherein the reciprocal data are stored in said first memory circuit in a compressed form with leading zero-valued bits removed and with one leading one-valued bit removed.

\* \* \* \* \*